United States Patent
Akhave et al.

(10) Patent No.: US 7,132,159 B1
(45) Date of Patent: Nov. 7, 2006

(54) CONTROLLED DROPLET FORMED LAYERED STRUCTURES

(75) Inventors: Jay R. Akhave, Claremont, CA (US); Ghanshyam H. Popat, Ridgecrest, CA (US); Paul B. Germeraad, Saratoga, CA (US); Jessie C. Reaves, Los Angeles, CA (US); Timothy Ryan Eckhardt, Covina, CA (US); Mark Anthony Licon, Diamond Bar, CA (US); Pradeep S. Iyer, Hacienda Heights, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/647,752

(22) PCT Filed: Dec. 7, 1998
(Under 37 CFR 1.47)

(86) PCT No.: PCT/US98/25875

§ 371 (c)(1),
(2), (4) Date: Apr. 16, 2003

(87) PCT Pub. No.: WO99/29436

PCT Pub. Date: Jun. 17, 1999

Related U.S. Application Data

(60) Provisional application No. 60/067,904, filed on Dec. 8, 1997.

(51) Int. Cl.
*B32B 7/12* (2006.01)

(52) U.S. Cl. ............... 428/343; 428/40.1; 428/201; 428/906; 156/310

(58) Field of Classification Search .......... 428/40.1, 428/201, 906, 343; 156/310
See application file for complete search history.

(56) References Cited

U.S. PATENT DOCUMENTS

| | | | |
|---|---|---|---|
| 4,183,978 A | 1/1980 | Hefele | 427/202 |
| 4,204,017 A | 5/1980 | Hefele | 428/160 |
| 4,606,956 A * | 8/1986 | Charbonneau et al. | 428/40.2 |
| 4,768,810 A * | 9/1988 | Mertens | 462/26 |
| 5,032,449 A * | 7/1991 | af Strom | 428/195.1 |
| 5,194,299 A * | 3/1993 | Fry | 427/208.6 |
| 5,418,078 A * | 5/1995 | Desie et al. | 428/32.3 |
| 5,476,712 A * | 12/1995 | Hartman et al. | 728/317.3 |
| 5,618,347 A * | 4/1997 | Clare et al. | 118/314 |
| 5,667,884 A * | 9/1997 | Bolger | 428/323 |
| 5,736,195 A | 4/1998 | Haaland | 427/180 |
| 5,795,636 A * | 8/1998 | Keller et al. | 428/40.1 |
| 5,935,670 A * | 8/1999 | Downs | 428/40.1 |
| 6,037,009 A * | 3/2000 | Clare et al. | 427/207.1 |
| 6,045,616 A * | 4/2000 | Williamson et al. | 118/301 |
| 6,187,432 B1 * | 2/2001 | Krish et al. | 428/343 |

(Continued)

FOREIGN PATENT DOCUMENTS

FR   2177038   11/1973

(Continued)

*Primary Examiner*—Rena Dye
*Assistant Examiner*—Tamra L. Dicus
(74) *Attorney, Agent, or Firm*—Fulwider Patton LLP; Scott R. Hansen

(57) ABSTRACT

A laminate, comprising a substrate and at least two controlled droplet-formed layers further comprising an array of discrete placed material volumes having a thickness extent, each material volume having a selected magnitude and a selected position relative to adjacent material volumes, said array being formed by deposition of droplets of selected volume at selected locations with respect to one another.

6 Claims, 10 Drawing Sheets

U.S. PATENT DOCUMENTS 6,383,591 B1 * 5/2002 Miles et al. ................ 428/40.1
6,686,016 B1 * 2/2004 Downs ...................... 428/42.2
6,749,707 B1 * 6/2004 Saksa et al. ................. 156/99
6,830,795 B1 * 12/2004 Downs ...................... 428/40.1

FOREIGN PATENT DOCUMENTS

JP      07-300840       11/1995
WO      WO 96/31291     10/1996

* cited by examiner

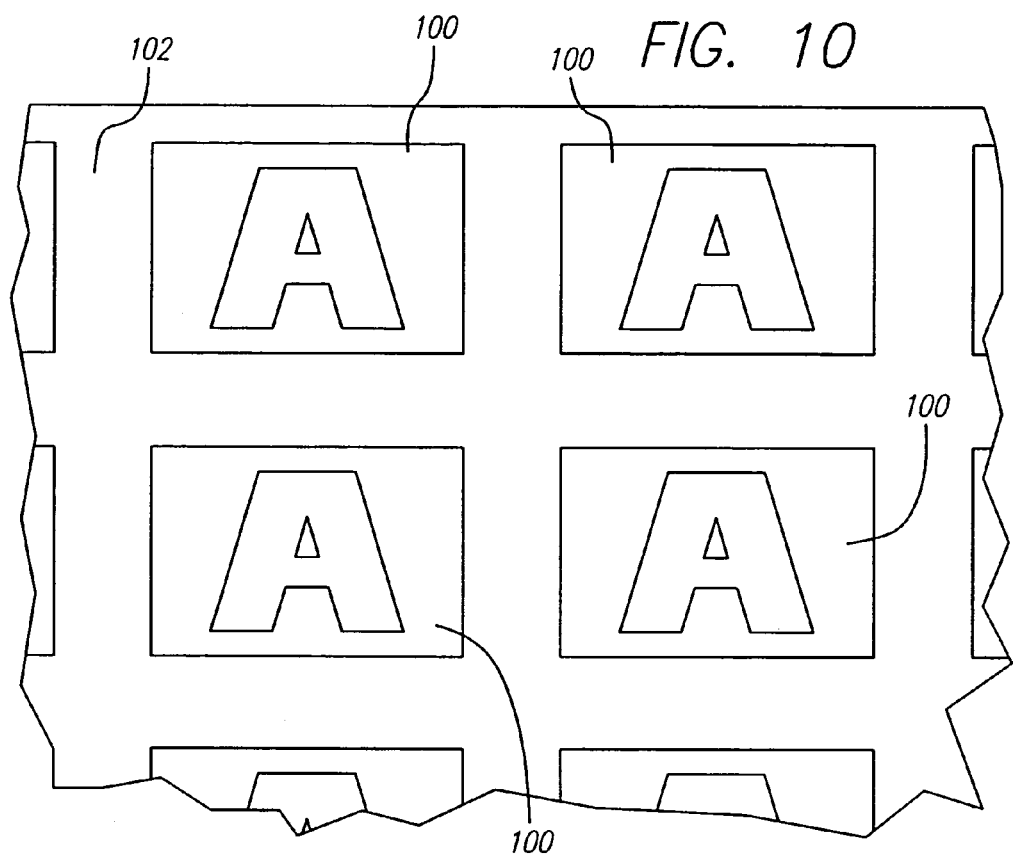
FIG. 10
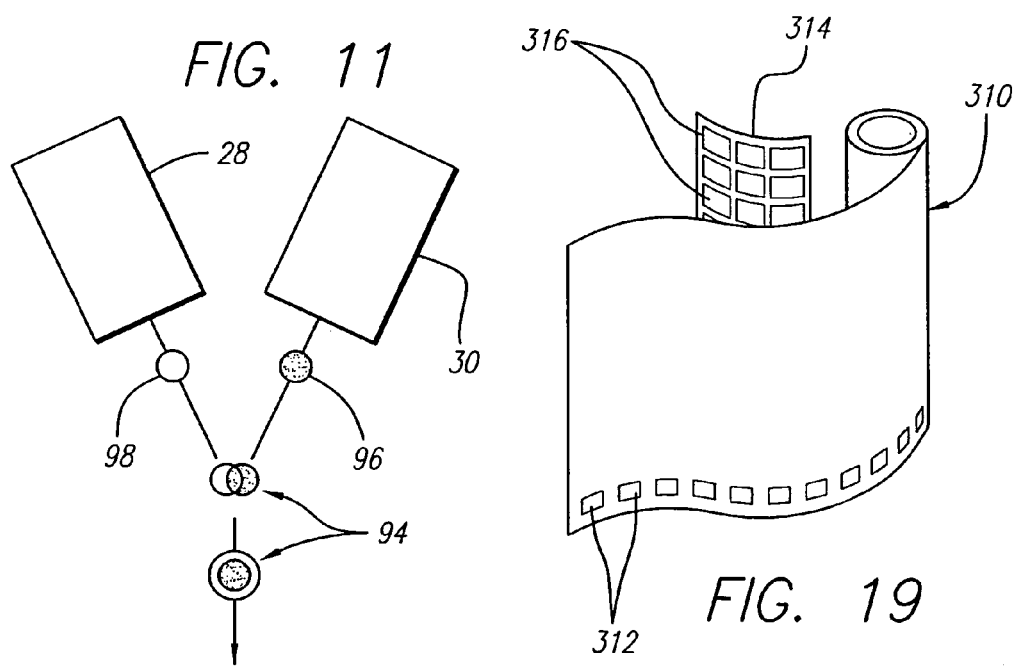
FIG. 11
FIG. 19

CONTROLLED DROPLET FORMED LAYERED STRUCTURES

This application claims priority from prior U.S. Provisional Patent Application Ser. No. 60/067,904 filed Dec. 8, 1997 the disclosure of which is hereby incorporated by reference.

BACKGROUND

1. Field of the Invention

This invention relates generally to formation of coatings, films and laminates. More specifically the invention relates to formation of layers of materials using controlled droplet formation and deposition techniques.

2. Description of Related Art

In the manufacture of coatings, films, and laminates it is often desirable to precisely control the physical characteristics and properties of individual layers of material laid down on a substrate. For example in the manufacture of pressure-sensitive adhesive (PSA) laminate constructions such as labels and tapes, control of physical characteristics such as the thickness, surface morphology and deformation with application of stresses, as well as material characteristics such as chemical composition, crosslinking of polymeric chains, the percent of solids in emulsions and solvents in solution, for example is desirable. This is true for an adhesive layer of such a construction, wherein properties such as tack, peel, stability, and resistance to solvents, for example, are desired to be controlled. It is also true for a release layer in such a construction, wherein properties such as release of the adhesive when used with a given PSA and underlying carrier, chemical and physical interaction with adjacent carrier and PSA layers, for example, are desired to be controlled. Also other layers of the laminate construction such as a facestock which influence overall laminate properties such its stiffness and whether the construction is self-supporting, whether the facestock can be printed, for example, are carefully designed and controlled in a PSA laminate construction product, and greater control over their properties is desirable.

In tape products and adhesive coated films dispensed from rolls, control of the properties of individual component layers is also highly desirable. Particularly since the final PSA product must be designed so as to incorporate an adhesive layer on one side that may be very aggressive, and on the opposite face incorporate a release surface, and the functionality of the two must be carefully balanced so that a desired peel force is achieved, control of the properties of these layers is critical to the functionality of the construction.

However, the need for precise control of the properties of constituent materials, individual layers, and overall performance is not limited to the forgoing examples involving PSA laminates. Many other applications, for example fabrication of electrical components having a layered construction, self-supporting polymeric resin films which can be built up in layers, layered coatings applied directly to products for protective purposes are some of many examples that can be cited.

Furthermore, many properties of layered constructions bear directly on the cost of the product including the layered construction. This is particularly true in labels and tapes and films where volume is high, for example. It would be very desirable to optimize one or more layers of a laminate so as to achieve the desired result with a minimum material requirement.

SUMMARY OF THE INVENTION

Briefly, and in general terms, the present invention provides a controlled droplet-formed layer laminate, comprising a substrate layer and at least two controlled droplet-formed layers further comprising an array of discrete placed material volumes having a thickness extent, each material volume having a selected magnitude and a selected position relative to adjacent material volumes, said array being formed by deposition of droplets of selected volume at selected locations with respect to one another in a layered way on the substrate. In a more detailed aspect, selected material volumes in the controlled droplet-formed layer can be formed of one or more different materials than other material volumes in the droplet-formed layer, whereby the controlled droplet-formed layer comprises at least two differing materials. In another more detailed aspect, selected material volumes in the droplet-formed layer or layers can be of different magnitude than other material volumes in the droplet-formed layer or layers.

In further detail, in one embodiment the substrate upon which the controlled droplet-formed layer is deposited also comprises a controlled droplet-formed layer of material. The controlled droplet-formed layer can be formed of a different material than the substrate.

In another detailed aspect, the controlled droplet-formed layer can be discontinuous and comprise an array of material volumes, wherein at a first selected location a material volume overlays the substrate and at a second selected location a material volume does not overlay the substrate upon which it is deposited. In a further detailed aspect the controlled droplet-formed layer can be made releasable from the substrate, the deposited layer or the substrate comprising a release material and the other a PSA material. In this detailed aspect the controlled droplet-formed layer can comprise a layer of a product selected from the following group: a film formed by depositing successive layers, a label having a plurality of layers, and a tape, for specific examples. In laminate constructions where the adhesive is a PSA, the adhesive can comprise one layer, and the construction can further comprise a facestock layer. Other layers such as a carrier layer, a primer layer, a printcoat layer, an image layer, and a protective coating layer, for example can be incorporated, at least some of which can be formed by controlled droplet deposition.

Such constructions allow very precise control of the formation of each layer formed in accordance with the invention. The placement of the volumes of materials can be by projecting droplets through the atmosphere to the substrate or by contact techniques, as described in further detail below. Further aspects and advantages achieved in accordance with the invention will be apparent from the following detailed description, taken together with the appended drawings.

BRIEF DESCRIPTION OF THE DRAWINGS

FIG. 10 is a top view of a matrix-free label construction made in accordance with the invention;

FIG. 11 is a schematic representation of a specialized mode of droplet formation in accordance with certain embodiment(s) of the invention;

FIG. 19 is an illustration of an illustrative embodiment of the invention;

DESCRIPTION OF THE PREFERRED EMBODIMENT(S)

Figure 1:
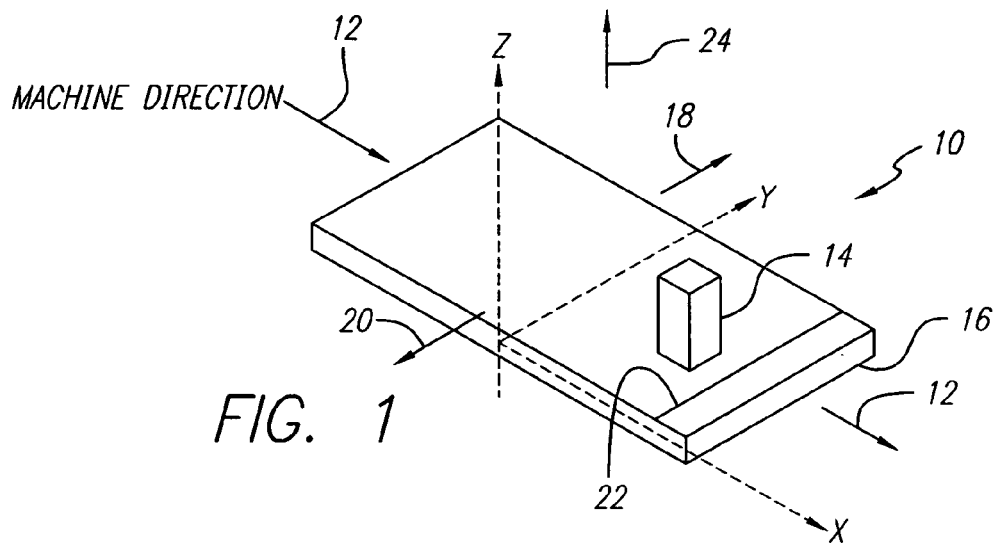
FIG. 1 of the drawings is a perspective view schematic representation of a layer construction and means of its formation, defining reference directions.
Figure 2:
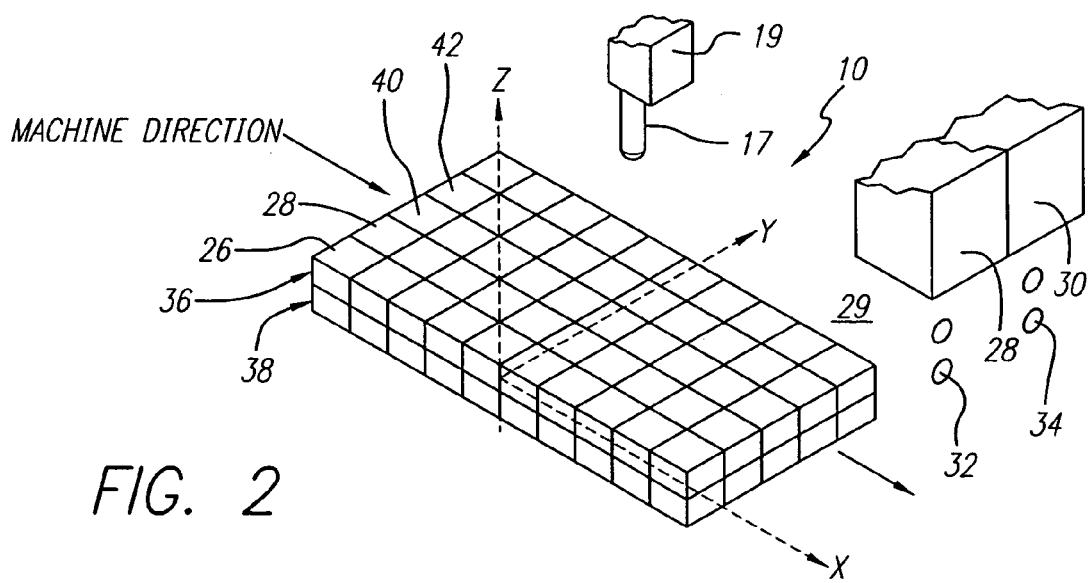
FIG. 2 is a perspective view schematic representation of a layer construction and means for its formation according to the invention illustrating different locations within the construction.

As shown in FIGS. 1 and 2 of the drawings for purposes of illustration, and not by way of limitation, a schematic representation of a laminate or layered construction 10 illustrating principles of the invention is shown. A Cartesian coordinate system for describing point to point variability of the construction is given. A first (x-axis) direction is parallel to a direction of relative movement of the laminate construction 12. A drop deposition means 14 such as a drop-on-demand or continuous stream droplet stream projector, for example such as a thermal or piezo-electric jet similar to that used in inkjet printing, is used to deposit droplets. This drop deposition means can be movable in a transverse (y-axis) direction, the drop deposition building up the laminate construction in a third (z-axis) direction. The drop projector can comprise other means for droplet formation, and can include electrostatic control of the trajectory of droplets emitted, for example. The feature of primary importance with regard to the means of drop deposition is that it is capable of depositing individual and discrete droplets in a controlled manner on a substrate 16, which may itself be one or more layers of the construction being formed or a casting sheet, for example. The drop deposition means can be a monodisperse droplet deposition means, in that all the droplets formed are of substantially the same volume of material, or a polydisperse means, in that the droplets can be formed having a controlled but variable volume. In this regard the drop deposition means 14 can alternatively be a contact device such as a capillary needle 17 positioned by a plotter 19, for example a Century Series Model No. C-702 manufactured by Asymtek, Inc. of San Carlos, Calif., capable of depositing discrete drops of material from the tip of the capillary needle using surface tension properties of droplets between the needle and the substrate 16 to advantage.

There can be relative movement in a second direction 18 parallel to a y-axis shown in FIG. 1. For example, the drop deposition means 14 can reciprocate parallel to the y-axis in the second direction and an opposite direction 20, laying down a new layer of material 22. The laminate is accordingly built up in a third direction 24 parallel to the Z-axis. Alternatively, numerous such drop deposition means can be provided in an array (not shown) so that each lays down a swath of material as the substrate moves by in the first direction 12 for example.

With reference to FIG. 2, the laminate construction 10 thus formed can be thought of as a compilation of individual domains or blocks, 26, 28 for example, representing individual droplets deposited. The size of each such block is defined by the volume of material contained in the droplet and shrinkage, if any, upon drying or curing, for example, the flow-out properties of the material laid down, and the resolution of the drop deposition means. As can be appreciated the material in adjacent blocks 26, 28 can be different. This can be accomplished, for example, by incorporation of multiple drop projectors in the drop deposition means. For example two or more side-by-side projector heads 28, 30 such as are provided in conventional ink-jet printers for example, each containing and projecting a different material 32, 34 can be provided. As the drop deposition means reciprocates parallel to the y-axis, the heads project droplets in a coordinated fashion so that differing droplets are deposited in position to form adjacent blocks 26, 28 in the laminate construction. For example a polystyrene drop, say 26, can be deposited next to a polyvinyl chloride drop, say 28. By providing further droplet projectors, three or more different materials can be laid down, for example the PVC drop 28 can be next to a polyethylene terephthalate drop 40 next to a polystyrene drop 42 comprising the beginning of a repeat of the pattern. This enables a layer 36 to be formed having unique properties comprising the combination of the properties of the component blocks representing controlled drops.

Likewise some blocks, 26 or 28 for example, can be left unfilled, creating a discontinuous layer 36 on top of the underlying layer 38 comprising the substrate in the illustrated case. The underlying layer likewise can be formed of two or more differing materials and can also be discontinuous, wherein such underlying layer is itself formed on an underlying layer or casting sheet (not shown) for example. The casting sheet comprises, for example, a Teflon-coated cylinder, but can be any substrate from which the deposited layers can be delaminated. The top layer 36 can be formed in this way to have a particular desired surface morphology on a very small scale, if that is desired. Also properties of the layer can be customized to a particular application intended for the laminate construction 10.

In one embodiment the drops 32, 34 forming the layer 36 are of consistent size. However, this is not necessarily required. For example, larger drops can be interlaced with smaller ones to form a pattern, using for example two drop projectors 28, 30 differing in the volume of material projected in each drop. Also, the velocity of the drops in non-contact embodiments such as thermal jetting, as well as their shape upon impact and/or subsequent flow-out can determine the geometrical variability of the deposited layer 36. As can be appreciated, depending on the material from which they are formed, selected to form the ultimate construction, the drops can be dispensed to flow out and connect to form a continuous film or alternately can be made to give rise to less flow-out, enabling placement of discrete droplets which spaces between them or a pattern having voids incorporated therein.

Using this technique, for example, a fluid permeable layer can be thus formed. The amount of flow-out of the droplets 32, 34 can be thought of as how "wet" the material being deposited is. The concept of deposition of individual droplets at specific spatial locations implies that the material upon which it is deposited is at least partially "dry" or has sufficient rigidity to resist deformation and therefore support the deposited material. However, within a particular structure 10 formed this is not necessarily a requirement, as long as the behavior of the material upon deposition is predictable so that control of the ultimate structure is possible. For example a larger area of "wet" material can be laid down and flow together to solidify as a single mass. This allows mixing of two materials by successive deposition in the same or overlapping locations for example. On the other hand, where less flow-out is desired or less bonding between deposited droplets is desired the previously deposited material can be more thoroughly dried before subsequent deposition of new "wet" material. As can be appreciated, in most applications the previously deposited material will be partially wet and partially dry, and a balance between the desired properties of the material will be struck with regard to how "dry" the previously deposited material is with respect to the newly deposited material. As will be apparent from this disclosure, a number of factors influence the drying of the material, from the nature of the material itself to simple variation in the distance a droplet 32, 34 travels through the air before deposition in the case of non-contact deposition techniques. For example the "in-flight" distance can be made much larger than conventional ink jet devices use to relatively thoroughly dry a droplet before deposition; which can be used for example to deposit a dry particulate coating to an underlying wet material.

With reference to FIGS. 1 and 2, and as mentioned above, the resolution of the drop deposition means 14, 28, 30 influences the physical properties of the layer 36 laid down. For example, if needle dispensing is used, the drop diameter will be roughly on the order of hundreds of microns. If a thermal or piezo-electric drop generator is used, the drop diameter will be about 15 to 100 microns. The finer the drop size, the greater will be the degree of control of the microarchitecture of individual layers 36, 38 and the laminate construction 10 as a whole.

Drying or curing of the material 22 once it is laid down is another important consideration. For example it may be necessary to add a solvent to the material so that it can be deposited by the drop deposition means 14. Emulsions can also be used. In each case drying is needed to bring the material to a desired percentage of solids, for example. Accordingly, the layered construction 10 can be treated between deposition of successive layers 36, 38, for example, by drying in a conventional dryer. Other methodologies for drying, as will be discussed below can be employed. If the material is such that it cures by chemical activity such as cross-linking, as is the case with some conventional silicone release materials this can be accommodated as well. For example in two part systems where one part which may contain a catalyst is combined with another part to initiate curing this can be done by depositing the respective parts in adjacent blocks in the x, y, or z directions, which may be followed by mechanical mixing, or can simply rely on the flow-out of the droplets to initiate cure. Alternatively two drop projectors can be used which cause the drops to collide and form a mixed droplet before deposition.

Viscosity of the material jetted is of great importance in conventional drop-on-demand and continuous drop projectors of the thermal jet and piezo-electric types, as it directly affects the instability of the projected stream which is depended upon to form the discrete droplets projected. Currently most conventional drop projectors of this type require a viscosity of about 20 CPAs or less for material to be jetable. However, drop projectors accommodating higher viscosities are known. Japanese Patent Appl. No. 07-300840 discloses an ink jet device jetting liquids having viscosities in the range of 20–200 cps at a temperature range of 5–35 degrees C. Nevertheless, materials used to form the layered construction 10 usually will need to be modified; for example by drying or otherwise curing them after jetting. To control flow-out this can be done in-flight as will be discussed below. Because the exposed surface area of projected droplets is large compared to their volume modification in flight can be advantageously done more readily.

Any drop-forming material compatible with the drop formation and deposition means 14, 17, 19, 28, 30 can be used, including emulsions, suspensions and solutions of materials used to form the construction 10. Jetting of high temperature liquid metals is known for example, and droplets of metals have been found to exhibit behavior predominantly Newtonian, rather than viscoelastic, in nature and exhibit well-formed droplets. Deposition of droplets of higher temperature materials such as liquid metal can lead to interactions with the substrate due to melting and re-solidification of the substrate material to obtain desired properties of a resulting composite material for example.

Other examples of materials to be deposited include inorganic soluble materials such as salts, which can form crystals upon drying. Such materials could be used to modify the construction 10, for example to lend stiffness in one bending direction. Also, pigments, inorganic compounds, particulate dispersions, and 100% solids solutions of inorganic materials comprise further exemplary illustrations of diversity of substances which can be deposited in droplet form to solidify and form a part of a structure. Moreover, materials can be used which react chemically with other deposited materials or a conventionally applied layer to form different materials.

In applications where a the layered construction 10 results in formation of a polymeric film, exemplary materials that can be used include polyethylene, polypropylene, polystyrene, polyvinyl chloride, cellophane, cellulose esters, polyurethane, polycarbonates, polyamides, flurocarbon polymers, polyester, polyvinylidene Fluoride, and polyvinyl fluoride. However the invention can employ any polymeric film material that can be dissolved into a solution having properties allowing deposition. Films thus formed can be customized, for example to be soft and flexible or brittle and hard, or some desired quality in between these extremes. A film formed in this way can be varied in all three dimensions.

Also other layers 36, 38 of layered constructions 10 formed in this way can be made to have differing properties in different dimensions. For example one or more adjacent layers can be made fluid permeable in the z axis, but impermeable in the x and y axes. Combining at least one layer including connected voids between two impermeable layers can form a construction permeable in the x and/or y dimensions but not the z. In another example where electrically conducting materials are laid down with non-conducting materials or with voids of sufficient size a layer conductive in the z dimension but not x and y for example can be constructed. Again using a laminate of at least three layers a construction electrically conductive in the x and/or y dimensions but not the z can be constructed.

As mentioned droplets 32, 34 traveling through the air or another gaseous environment created locally can be changed "in flight" to alter their physical or chemical properties. For example a "jetable" material having properties within well-known parameters for use with a thermal jet continuous or drop-on-demand device may need to be altered before deposition to control flow-out by altering the viscosity or another property. This is useful particularly when the desired end product material is not jetable, or can not be stored in that form for a needed amount of time prior to deposition.

Because the droplets 32, 34 formed can be quite small, in the range of about 25 microns to about 1000 microns, and the ratio of surface area to material volume is very large, the droplets can interact with the air or another medium or be readily treated by exposure to radiation. With small drops enhanced mass transfer rates from surface area considerations speeds drying. Also surface energy of the material dominates in morphology of the droplets and this can be exploited, for example to facilitate in-flight mixing or separation of two combined materials.

Figure 14:
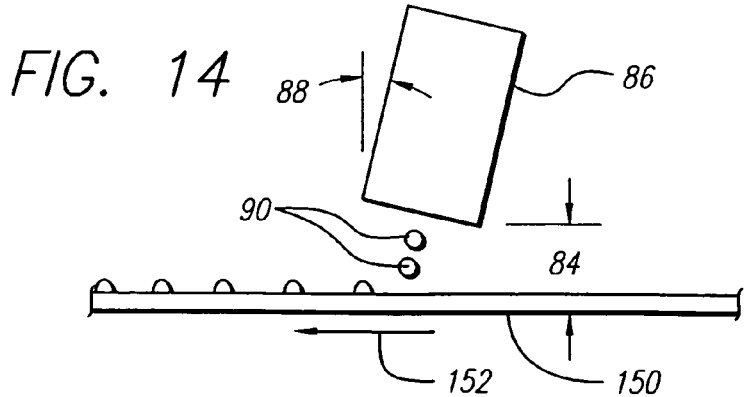
FIG. 14 is a schematical side view of a portion of the system shown in FIG. 13.

Droplets 32, 34 formed of an emulsion material can be dried in flight for example much more efficiently than after deposition on a layered construction 10 where only the top surface is exposed. By heating of the material prior to jetting and/or when jetting in a thermal jet, efficiency of drying is improved only slightly. Efficiency is however significantly improved by providing a zone of laminar flowing hot air 29 between the drop projector 28, 30 and the substrate on which material is to be deposited. With reference to FIG. 14 the distance 84 between a drop projector 86 and a substrate 92, the angle 88 at which the droplets 90 are projected, and the speed at which the droplets are ejected, drop diameter, the speed of relative movement between the drop projector and the substrate and the distance between drops are additional parameters which can be adjusted to increase or reduce drying.

Returning to FIG. 2 the droplets 32, 34 could also be otherwise treated "in flight," for example by exposure to radiation. In the case of a material cured by UV radiation a jetable material can be exposed in flight, initiating cure, producing an un-jetable material of desired viscosity at the point of deposition on the layered construction. Where the frequency of emitted radiation is matched with the size of the droplets a resonant internal reflection effect can be used to further enhance the cure; the frequency match and the curvature of the droplet cooperating to improve efficiency of energy utilization. Microwave and infrared heating of the material to increase drying efficiency can be used. Electron beams and lasers can be used to produce a desired change in materials which can be altered by radiation exposure.

In another method for in-flight processing of the material the jetted material 32, 34 may be made to react chemically with the medium through which they pass. Air well saturated with water for example can be provided, and moisture-cured materials can be projected therethrough with cure being initiated in flight. Additionally, surface chemistry with the air or other reactive gas medium can be conducted at the surface of the spherical droplets in flight.

Two droplet projectors 28, 30 can be oriented so that the trajectories of drops 32, 34 projected will intersect. With reference to FIG. 11 the drops are generated simultaneously and collide to form a new droplet 94. The mixture of the two materials gives rise to a material having different properties than one or both of the two original materials. For example two jetable materials combine in flight to form a non-jetable material.

Also using the two drop projectors 28, 30 oriented to produce intersecting trajectories, a different phenomenon characteristic of small droplets 96, 98 can be used to advantage. In the case where one of the two different materials combined has a comparatively high surface energy and the other a comparatively low surface energy, after initial mixing the materials quickly separate and the material having a low surface energy forms a shell around the material having a high surface energy. In this way a deposited drop having specialized characteristics is made possible. For example, micro-encapsulated materials can be deposited when the outer shell interacts with the air or other gas medium through which it flies to form a stiffened material which resists destruction of the shell on impact with a substrate layer (not shown) on which it is deposited. In this way both the structure of the micro-encapsulated materials and their placement can be carefully controlled. Alternatively if the shell is destroyed on impact the material will subsequently separate. This can result in a deposited material of two layers performing differently than if they were laid down consecutively, for example having a stronger bond due to incomplete separation giving rise to striations of one or both materials being formed extending into the other.

Figure 3:
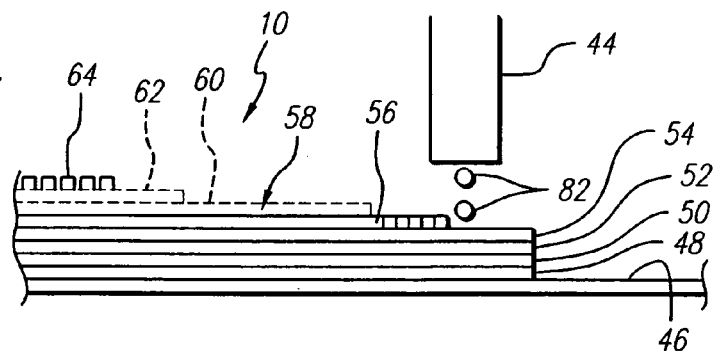
FIG. 3 is a schematic illustration representing a side view partially in section of a layered construction illustrating principles of the invention.

With reference now to FIG. 3, an exemplary layered construction 10 is formed as described above using a controlled droplet projector 44 is illustrated schematically. Taking as an example for purposes of illustration but not by way of limitation a laminate construction including a PSA such as used in forming a label, tape, or adhesive film for example, the laminate can include all the layers necessary to form the construction laid down by controlled droplet deposition. In the case of "net form" manufacturing of labels for example the entire layered construction can be fabricated "digitally" to a particular micro-architecture desired. This means the layers can be micro or macro patterned to obtain different properties within the spatial space of the laminate construction. Alternatively one or more of the layers is can be applied conventionally for example by a contact lamination process, gravure printing, conventional spray coating, etc. As an example the case of a PSA label can include a carrier 46 such as a conventional kraft paper. This can be overlain with a release layer 48 for example of a silicone material which can be limited to the area where successive layers will be formed. As can be appreciated this allows a matrix free construction, eliminating the need for die cutting and matrix removal, a very significant manufacturing cost consideration. Such a construction is shown in FIG. 10, where labels 100 are deposited on a substrate 102. The substrate can be a carrier in sheet or roll form, a casting sheet from which the labels are subsequently de-laminated, or a product to be labeled. Returning to FIG. 3, a PSA layer 50, which itself can comprise multiple layers, is deposited on the release layer. It will be understood that each layer described could itself be a multi-layer construction, and moreover could also be made thicker using larger droplets. A primer layer 52 can be next formed. Overlaying this a facestock layer 54 is formed, a printcoat layer 56 is deposited next, followed by an image 58 which can include designs, photographic images, etc. possible using drop-on-demand techniques, including color photographic images for example jetted using conventional ink jet print heads for example. Alternatively the printcoat layer could be laid down using different pigmented materials to form the image. A protective coat layer 60 is deposited over the image. The construction can include additional layers, for example another carrier layer 62 to support a label which is not self-supporting due to the thinness of the layers made possible by the construction in accordance with the invention, or a discontinuous layer 64 for example to provide a textured surface for visual or tactile effect.

In another embodiment the controlled droplet-formed layered construction 10 can be constructed in reverse, laying down the successive layers in the opposite order. This can be advantageous in certain applications where matrix-free labels for example are formed on a casting sheet or drum and thereafter transferred to a carrier or directly to another product to be labeled by means of the PSA layer which is deposited last. This eliminates the need for a carrier and release layer in the latter case.

As will be appreciated the particular layers included in the laminated construction 10 will vary with its intended use. Also, not all layers need by formed by a controlled droplet technique. One or more layers can be formed using conventional techniques.

As mentioned above, control of the micro-architecture of each layer allows novel laminate constructions 10. For example, the release layer 48 can be designed to provide a desired release by several mechanisms facilitated by the invention. As mentioned differing materials can be laid down in the x and y dimensions to form the layer. Two different release materials could be employed to obtain desired advantages of each. Moreover the PSA layer could be likewise constructed using different materials. This would allow for example a much wider temperature range in use of the product formed because one material may be optimized for a first temperature range and a second material for another range. A third material can be incorporated to give additional performance enhancement, and so on.

In another embodiment illustrating novel product constructions, a product comprising "tape-on-a-sheet" is produced. Constructing a laminate structure 10 comprising a carrier 46 and release layer 48 which is overlain with a PSA layer 50 and a thin clear face stock layer 54 laid out in rectangular strips, one end of which may be given a different PSA/release configuration to locally give a low lift-off for example, resulting in ready-to-use-tape strips. A unique application of this aspect of the invention is shown in FIG. 19. A roll of gift wrap paper 310 is locally modified by deposition of a release layer, PSA layer, and facestock as described above to form tape segments 312 along one edge. The carrier forms a part of the product in this case. This construction enables a purchaser to use the wrapping paper to wrap an object without need to obtain a separate roll of tape, or scissors for that matter if care is used in folding and tearing the paper, or if perforations or a cutter (not shown) is included in or with the product. Alternatively a backing sheet 314 with a number of tape segments 316 of various sizes deposited thereon can be packaged with the roll 310.

Figure 4:
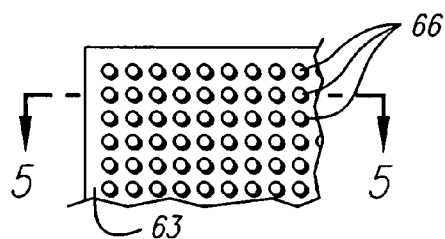
FIG. 4 is a top view of a layer of a laminate construction.
Figure 5:
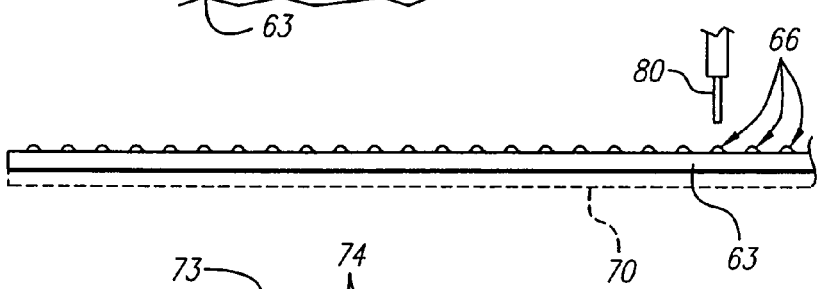
FIG. 5 of the drawings is a cross sectional view of the laminate construction shown in FIG. 4 taken along line 5—5 in FIG. 4.

With reference to FIGS. 4 and 5, as mentioned a discontinuous layer 66 can be formed on a substrate 68 comprising another layer, particularly in the case of a release layer where the release material is deposited on a carrier this can be used to provide another controllable variation in the release obtained. A release value obtained for a PSA layer (not shown) placed over such a discontinuous release coat layer is modified by spacing and size of the controlled deposited droplets, allowing more or less contact area between the PSA and the release material and contact with the substrate. This affects the peel of a label for example and can be used to increase or lower the peel force at a given peel rate. Accordingly the release can be modified at a first end of a label comprising a leading edge for example by decreasing the spacing between drops laid down so that the peel force needed to delaminate at that location is lower. This allows thinner labels to be dispensed, for example, as they can more easily by lifted at the leading edge. Proper registration of the location of this modification with the rest of the label construction is important.

Figure 20:
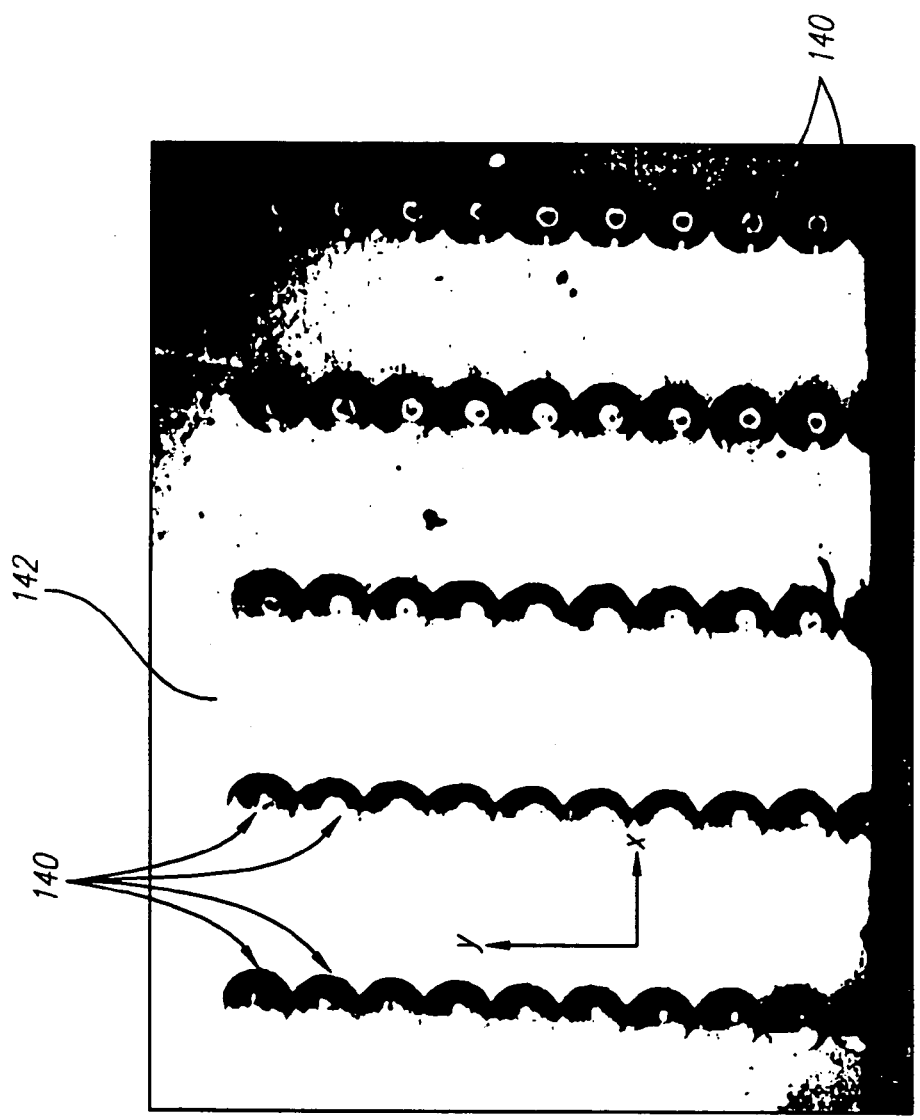
FIG. 20 is a photographic illustration of an embodiment of the invention.

Moreover, with reference to FIG. 20, the pattern of material 140 deposited on a substrate 142 can be varied to provide different properties locally in the x, y, and z-directions. For example in the illustrated embodiment a commercially available general purpose acrylic emulsion is deposited in rows on a 2 mil mylar substrate by a contact technique using a plotter and dispensing capillary needle as described above. The pattern provides different peel characteristics in each of the respective x and y-directions, by different droplet spacing. Surface topology (z-direction) is also locally variable.

Figure 21:
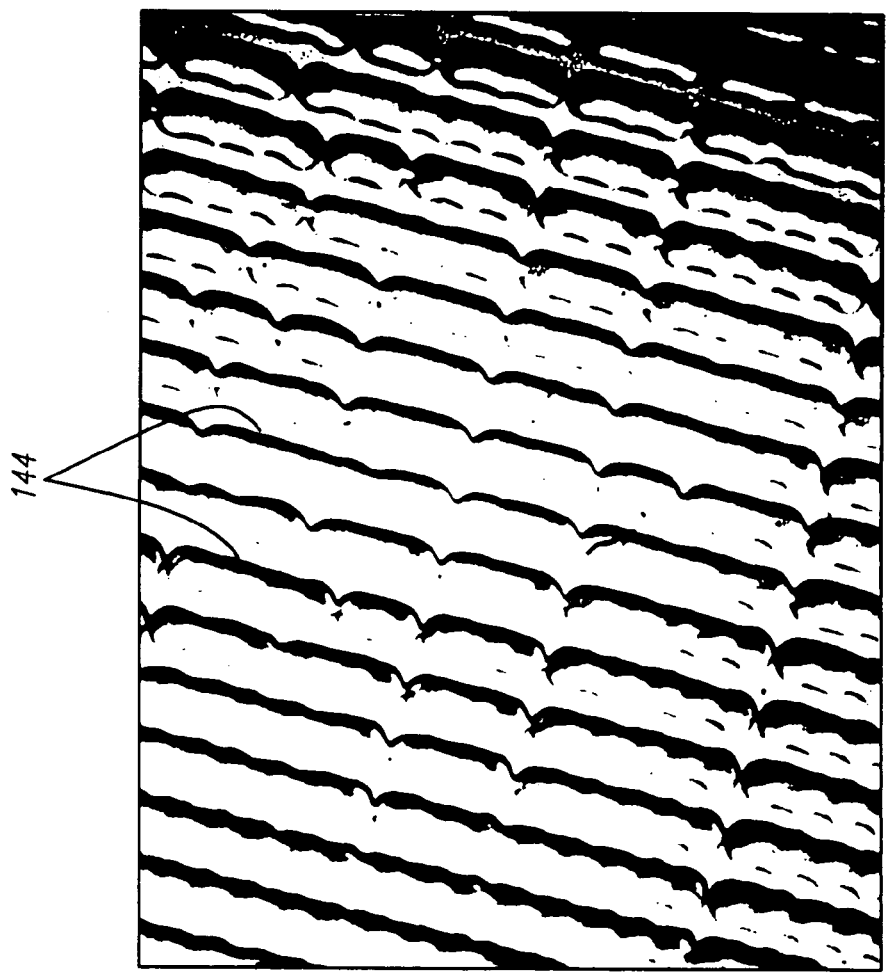
FIG. 21 is a photographic illustration of another embodiment of the invention.

With reference to FIG. 21 by controlling proximity of placement and flow-out of the deposited material further variability is possible, as illustrated by the aligned line segments 144 showing a pattern imposed upon a pattern to vary the properties of the layer locally. As can be appreciated lines of comparative weakness can be formed, for example to provide a "crack and peel" line in a PSA laminate construction.

Figure 22:
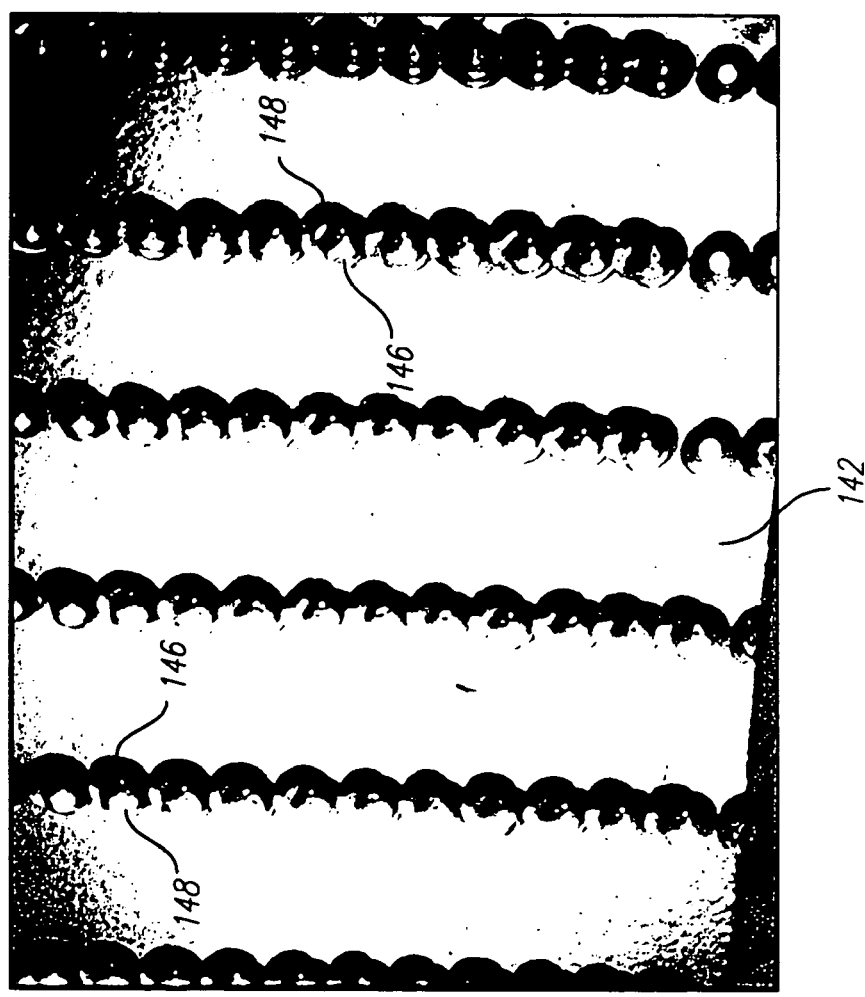
FIG. 22 is a photographic illustration of a further embodiment of the invention.

Registration of the deposition pattern is important where two layers cooperate to create a particular material topology, for example. In FIG. 22 two successive layers of adhesive droplets as just described are deposited, one on top of the other. This allows build up of the layer construction in the z-direction on the substrate 142 as described herein.

Figure 6:
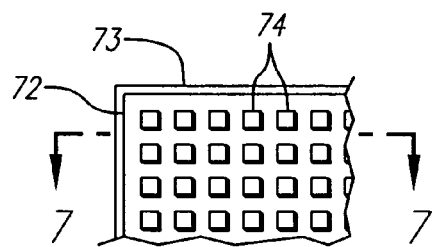
FIG. 6 is a top view of a layer of a laminate construction in accordance with the invention with portions of the construction illustrated schematically.
Figure 7:
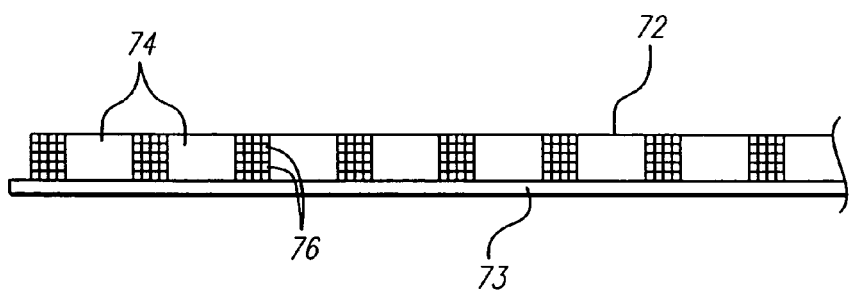
FIG. 7 is a cross-sectional view of the laminate construction shown in FIG. 6 taken along line 7—7 in FIG. 6 with portions of the construction schematically illustrated.

With reference to FIGS. 6 and 7 an alternative construction of a discontinuous controlled droplet-formed laminate layer 72 is shown. Here the pattern of deposition on a substrate 73 forms a layer that has a pattern of separate voids 74 in an otherwise continuous layer. As shown the layer can itself be made thick by successive layer deposition, as shown schematically by individual blocks 76. Registration must be carefully controlled in the latter case to insure that successive layers are deposed precisely on top of each other. Such a configuration is fluid permeable in the z dimension and can be used for example in forming air permeable films, but in the present example such a layer can form a release coat.

Figure 8:
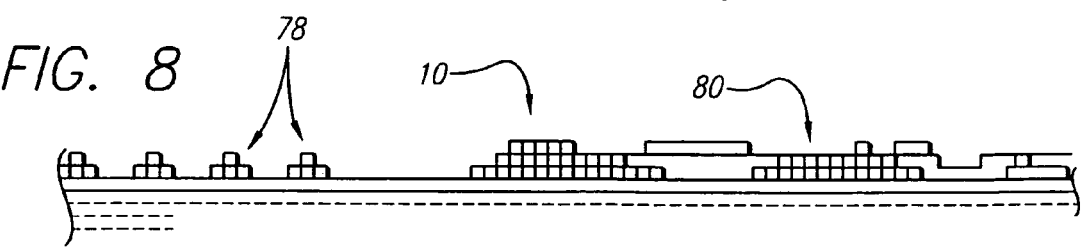
FIG. 8 is a cross-sectional view of a laminate construction in accordance with the invention illustrated schematically.

As illustrated schematically in FIG. 8, great variation in surface topology is facilitated by the invention. For example, separate built-up areas 78 can be patterned into the surface, as can an almost infinite variation in surface texturing shown in a textured area 80. Moreover, texturing to provide tactile and/or aesthetic visual effects is possible, for example in a top surface of a laminate construction 10 such as a label or film made in accordance with the invention.

With reference to FIG. 3 modification of the micro-architecture of the release layer 48 can also effect properties of the PSA 50 after separation and removal from the release-coated substrate 46, 48. For example, if a multi-layer release coat is used the surface morphology can be controlled, for example to provide a roughened texture to the surface of the release coat. A PSA layer deposited can thereby be made to have a corresponding roughened surface morphology. This is an important consideration in the design of PSA laminates, for example in label applications where air entrapment under a dispensed label is to be minimized. Using principles of the invention surface morphology can be more controlled far more easily than conventional methods of release coating deposition allow.

In another example where controlled deposition forms pores in the release layer 48 for adhesive to penetrate, greater repositionability of the freshly de-laminated PSA 50 is facilitated by fibrils generated on de-lamination. In another example the adhesive can be detackified in areas exposed to a substrate designed to provide detackification of PSA contacted with it. The fibrils serve to reduce contact area between the PSA bottom surface and the substrate for some time period.

By controlling the morphology of the release layer 48 in addition to the release material used, more precise control of release value and topology of the PSA 50, both important parameters in the PSA industry, is made possible. This increased control of PSA laminate parameters is highly desirable.

Another application of the invention is the formation of printable release coats. With reference to FIGS. 4 and 5 for example this is facilitated for example by allowing printing of the substrate 68, even though the release material 66 will not accept ink, by migration of ink through a discontinuous release layer 66 to the substrate. An exemplary embodiment in practical application comprises a roll of self wound PSA postage stamps that is "self releasing;" allowing dispensing in a manner similar to dispensing tape and also having a top surface that will release the adhesive but also accept ink. A laminate construction having a PSA layer 70 on the bottom for example of a pre-printed and/or printable paper carrier comprising the substrate 68 overlain with a discontinuous release material layer 66 comprising individual droplets is wound in a roll. The stamps can be peeled and individually dispensed onto letters. The stamps can be subsequently canceled as the substrate accepts ink which passes through open areas in the release layer as described above.

In another embodiment the stamps themselves could be printed over the release layer. Perforations (not shown) making individual stamps separable can be die cut in the substrate.

Figure 9:
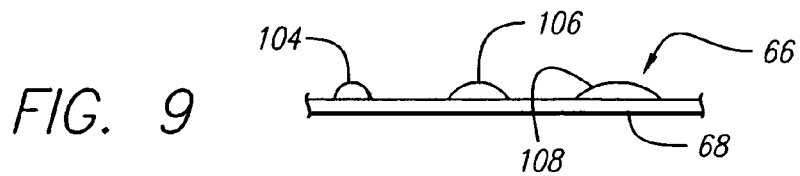
FIG. 9 is a cross-sectional view of a portion of a laminate construction in accordance with the invention.

The printability of the release coat layer is controlled by the amount of open area between the deposited droplets forming the layer 66. This in turn is controlled by the spacing of deposited droplets, as well as material volume in each droplet, and by flow-out. Reference to FIG. 9 will help illustrate the latter consideration as variation in flow-out is shown. Printability of conventionally applied releases is poor and the advantages obtained by the invention are important in this regard.

Returning to FIG. 3 release layer 48 materials can be deposited using contact techniques such as capillary needle dispensing from a plotting device described above, or jetting from drop-on-demand or continuous drop projectors. It has been found in the later case that such a release material layer can be formed for example by jetting polydimethylsiloxane silicone from a monodisperse ink-jet print head. In a continuous mode of operation such a jet drop projector was able to lay down drops at the rate in the range of about 15 Hz to 14 Khz. The material can be in a pure form or in a water emulsion, for example of about 25% solids, viscosity being up to about 20 cp. As mentioned above, in reality the only limitations on materials are the requirements of the particular application and compatibility with the means of droplet formation and deposition.

With reference to the PSA layer 50, attributes of the adhesive layer such as adhesion to a substrate of a given surface energy and variation of performance with temperature can be controlled by exploiting the control of placement of materials using controlled drop deposition techniques. Other important attributes such as water resistance, cohesive strength, edge ooze, and die cuttability can be varied also. Furthermore properties can be varied from place to place within the layer in a controlled manner, which is generally difficult using conventional techniques.

Thickness of the PSA layer 50 influences performance of the adhesive and the laminate construction 10 as a whole. Conventional coat weights are generally above about 15 grams/square meter. However, other layers of the construction can be made thinner by virtue of the invention and accordingly the adhesive layer can be made thinner and serve the same adhesive function. When formed using controlled droplet deposition, very thin labels, for example in the range of 8 to 96 microns, can be formed. By forming very small droplets and/or spreading or "smearing" them out on impact with a substrate, even thinner labels are possible.

In general, an example embodiment a PSA layer 48 will have a coat weight of about 5 to 500 grams/square meter, and a thickness in the range of about 5 to 500 microns. A facestock layer 54 formed by controlled droplet deposition can likewise have a thickness of about 5 to 500 microns for example. As will be appreciated, with label constructions at the thin end of the range made possible by the invention unconventional dispensing techniques can be employed to dispense such thin labels. For example dividing the underlying carrier 46 and release 48 and dispensing over a V-shaped notch in a Ventura dispenser for example as described in U.S. Pat. Nos. 4,217,164 and 4,303,461 hereby incorporated by reference.

Thinner constructions provide many advantages, for example thinner PSA layers have less tendency to bleed out from overlying layers at the edges in certain applications. Thinner constructions are easier to remove. For example in interior or exterior signage, where laminated graphics occasionally need to be replaced, these can be more easily removed from a substrate to apply a new laminate, for example by simply scraping them off rather than trying to delaminate them from a substrate. In all applications cost savings are realized in that less material is required.

Moreover, the adhesive layer 50 can itself comprise a plurality of layers, for example in known two-layer constructions a dual die coating process is used to form the layers or it is done by laminating two layers of coated adhesives together. Using controlled droplet deposition techniques the bond between the two adhesive layers can be strengthened by virtue of providing a roughened surface topology at the interface. Also, a first deposited layer can include discrete voids or comprise discrete placed material, the overlying adhesive layer thereby filling in the spaces to form an adhesive on a bottom side having properties comprising the sum of the two adhesives properties and on a top side a single adhesive with a patterned surface morphology.

For example it has been found that a commercially available emulsion adhesive such as a general purpose acrylic emulsion adhesive having a percent solids in a range compatible with the dispensing equipment used (30%–60%, depending on equipment, for example about 30%), can be pattern deposited on a substrate then over-coated with a commercially available all temperature acrylic emulsion adhesive, also for example at about 30% solids. This was done for example using a Asymtek plotter as described above. The resulting adhesive layer construction comprises a general purpose adhesive on one side and an all-temperature adhesive on the other side. Much less of the more expensive all-temperature adhesive material is used in this construction when compared with conventional die coating of two continuous layers to form the construction in conformity with presently known techniques which cannot give the fine control possible with controlled droplet deposition of the invention.

Similar to the discussion of the release layer above, the PSA layer 50 can be pattern deposited on a substrate such as a release coated carrier 46, 48. With reference to FIGS. 3 and 5 a PSA layer 50 can be deposited in a pattern by a contact technique such as a capillary needle 80 dispensing means. Alternatively, the PSA material can be projected from a controlled droplet projector 44. If the construction is built up from the other direction it can be deposited on a facestock 54 or primer layer 52 for example. The adhesive can be deposited in a continuous layer by using flow-out of the deposited droplets to join them together and/or by depositing the droplets close together. Patterns of discrete droplets or alternatively patterns of void areas in an otherwise continuous layer, as shown in FIGS. 4 and 6 can be deposited. Other patterns are possible, and can be used to advantage in particular applications.

In one specialized embodiment a two-part adhesive 50 can be laid down in discrete drops forming a pattern where the two parts comprise adjacent drops. Upon mechanical mixing the two parts will combine and react to produce a required product. The reaction can be a curing reaction or an inhibiting reaction.

In another specialized embodiment an adhesive which is conductive only in the z-axis is formed in a manner described above by depositing discrete volumes of a conductive adhesive comprising an emulsion containing a conductive material and depositing a non-conductive adhesive in between such discrete volumes preventing electrical conduction in the x-y plane.

It has been found that when a patterned adhesive layer of a general purpose acrylic emulsion adhesive is formed on a Mylar substrate using a Asymtek C-702 plotter described above in this way, and a conventionally sprayed polydisperse layer of the same adhesive material and coat weight (0.5–2.4 grams/square meter) is sprayed on an identical substrate, the 90 degree peel values for the uniformly patterned adhesive are higher. In another example, it has been found that a low grit acrylic emulsion adhesive with up to 30% solids filtered with a 5 micron filter and continuously jetted from a vibratory orifice air guided drop projector manufactured by TSI, Inc. of Minneapolis, Minn. produces a controlled stream of droplets having a diameter of 56 microns. Special care to minimize grit and coagulum in the synthesis of emulsion adhesives must be taken to prevent clogging of jet orifices. Solution adhesives can also be used. However emulsion adhesives have an advantage in that the carrier medium is generally more viscoelastic. Other factors being held equal increased viscoelasticy gives rise to a more damped growth rate of the instability essential to droplet formation. For example it has been found that where water is the medium, droplets are well formed, whereas in the case of a solution polymer adhesive the droplets are less well formed.

Droplets in the range of about 50 to about 130 microns have been jetted and smaller diameters, down to about 15 microns for example, are possible with presently known jetting devices. The size of droplet is material an application dependent. The upper limit on droplet size is the point at which they begin to break up in flight, making them uncontrollable, which generally begins to occur at about 500 microns. Using a controlled droplet deposition technique to produce droplets in this general size range gives a number of advantages in forming the PSA layer 50, and by extension of the same principles the other layers of a laminate construction 10. As individual droplets 82 travel through the air or another gas environment between the drop projector 44 and the laminate construction they can be modified in various ways as before described.

Variation of the adhesive material comprising the layer 50 or altering its performance parameters locally is also possible. This is done by alteration of the pattern of deposition, or depositing a different adhesive material, or applying a detackifing material to locally detackify the adhesive.

For example in forming a label having a multi-layer construction 10 such as that shown in FIG. 3, it may be desirable that the adhesive at the edges of the label have different properties than that in the interior of the adhesive layer 50. This variability made possible by the invention can be used to mitigate edge-oozing of the adhesive, or to prevent moisture from penetrating into the adhesive layer 50, as well as locally varying the properties of the adhesive to facilitate delamination at the edge of the construction 10. In another example an aggressive general purpose adhesive or a UV-resistant adhesive is applied in areas away from the perimeter, and a sealing adhesive or water-resistant or low edge-ooze coat can be applied at the edges. In conventional multi-layer PSA laminate constructions, where a facestock 54 for example is to be anchored to a particular substrate the choice of the facestock, adhesive, and release 48 affect the overall performance in a particular use environment. In selecting an adhesive for a conventional single adhesive layer, a compromise is reached, which generally means a particular property is compromised to achieve an adequate performance in terms of another property of the construction. As will be appreciated from the foregoing the need to compromise is mitigated using layer-forming techniques in accordance with the invention.

In the case of detackification of the PSA layer 50, in one embodiment microspheres mixed with a jetable fluid carrier are deposited in desired locations using a thermal jet device as the drop projector 44. The microspheres are left on the surface after drying of the carrier fluid.

In regard to pattern deposition of the PSA layer 50 it will be appreciated from the foregoing that a desired micro or macro patterning of the adhesive layer is facilitated. As an example of application of the invention a medical adhesive can be pattern coated in a laminate construction to provide air permeability and increased comfort to the wearer. It has been found that pattern-coated A general purpose acrylic emulsion adhesive laid down on a liner, dried, then laminated with a polyurethane facestock provides higher moisture vapor transmission rate values and better comfort than that achieved with a spray-coated adhesive when all other conditions are held the same.

In another example performance of an adhesive transfer sheet is improved using a controlled drop-formed adhesive layer 50. In a conventional adhesive transfer application, a continuous coating of PSA on facestock is detackified with a temperature-activated system. Graphics are printed on the facestock. Upon applying the construction to a substrate and exposing the printed top surface of the facestock to light, the facestock is heated at the location of the ink deposited there in printing the graphics. The underlying PSA layer is activated only underneath the ink. Upon removal of the construction adhesive transfer to the substrate takes place in the image of the printed graphic on the facestock. The adhesive comprises an open tacky surface on the substrate and can be used to attach glitter and other decorative material. Replacing the conventional continuous PSA layer with a pattern coated controlled droplet-formed layer of A general purpose acrylic emulsion adhesive using a Asymtek A-402 plotter at a coat weight of 4.5 grams/square meter, detackified with a powder detackification process using a 12-hydroxystearate salt of ethylenediamine, improved performance over conventional PSA coatings used in this application. Cleaner lift-off and cut of the transferred adhesive is observed, preventing stringing at the edges of the image typical of conventional constructions of this type.

With regard to the exemplary embodiment comprising a PSA laminate construction 10, the facestock layer 54 can comprise a plasticized film-forming material deposited by a controlled droplet deposition technique discussed above. In one embodiment such a facestock is formed by using an Asymtek plotter as described above to deposit drops by a #25 capillary needle, the material being 25% Dioctyl adipate in a 94/6 Vinyl Chloride/vinyl acetate copolymer (in a 60/40 Methyl ethyl ketone/Toluene solution, solids 30%). The dispensing pressure was 8 lbs/in$^2$. Coat weight after drying was 98.6 grams/square meter. In another embodiment the plasticizer can be controllably placed to vary the film forming the facestock layer spatially.

In a facestock layer 54 comprising a single layer of droplets, surface topology is controllable by variation of the flow-out. Flow-out in turn can be controlled by variation of factors such as drying rate coupled with spreading rate. The spreading rate itself is dependent on substrate surface interactions including wetability of the substrate by the deposited material, as well as viscoelastic properties of the material(s) deposited, and surface area considerations. The tendency of the material to spread and level is checked by the rising viscosity of the material as it drys to give a resulting deposited discrete droplet, patterned deposition, or continuous surface topology.

In this way the combination of controllability of the location of deposition, the volume of material deposited, and the flow-out of the deposited material is used to controllably alter the physical as well as the materials characteristics of the facestock layer 54. For example surface roughness can be locally varied, for example providing a smooth central portion of a label facestock and a rough, or bumpy, perimeter. This can be used to provide a desired functional and/or tactile effect. Optical illusion effects such as a "brush stroke" effect is possible, which provides a surface that appears hand-painted when printed over with a color graphic of a painting for example.

The facestock can be designed and constructed using the controlled droplet deposition methods heretofore described to have particular properties desired. By way of example forming a desired thickness including ultra-thin facestocks; and modification of the layer by modification of the morphology and composition of the material as discussed above, to give a desired Stress/Strain relationship.

With regard to the print coat layer 52, image 58, and protective coat layer 60, the image is encapsulated between two layers to protect it. However the construction can be designed to have unique properties. In an exemplary embodiment a continuous layer of 15% solids water solution of HEMA copolymer having high water absorbing properties was formed on a 2-mil mylar carrier using a plotter and capillary needle drop deposition means as described above. Then a color image layer was formed by a conventional thermal ink jet printer depositing controlled droplets of inks of differing colors on the print coat layer formed. This was overlain with another layer of HEMA copolymer comprising the protective coat. The edges of the top and bottom layers extend beyond the deposited image to encapsulate it. It was found that the image can be made to disappear due to a change in opacity of the protective coat layer by reason of water absorption, and reappear upon drying. This effect can be used in security application and specialty labels. For example in a medical application a label incorporating such an encapsulated image is applied to a dressing which is required to be moist. When the moisture at the top surface where the label is located drops below a selected threshold the water absorbing coating loses opacity and a graphic image indication that the dressing is too dry appears. As can be appreciated the label design requires that moisture be able to reach the encapsulating coating, for example through a permeable construction made possible by pattered deposition of a PSA.

Figure 12:
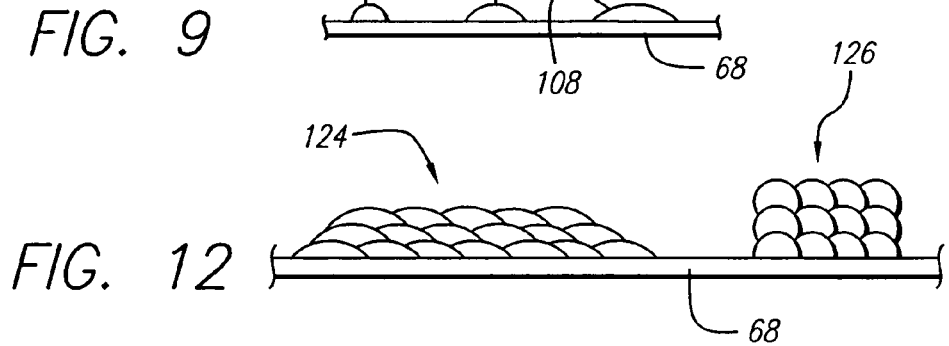
FIG. 12 is a cross-sectional view of a portion of a laminate construction in accordance with the invention.
Figure 13:
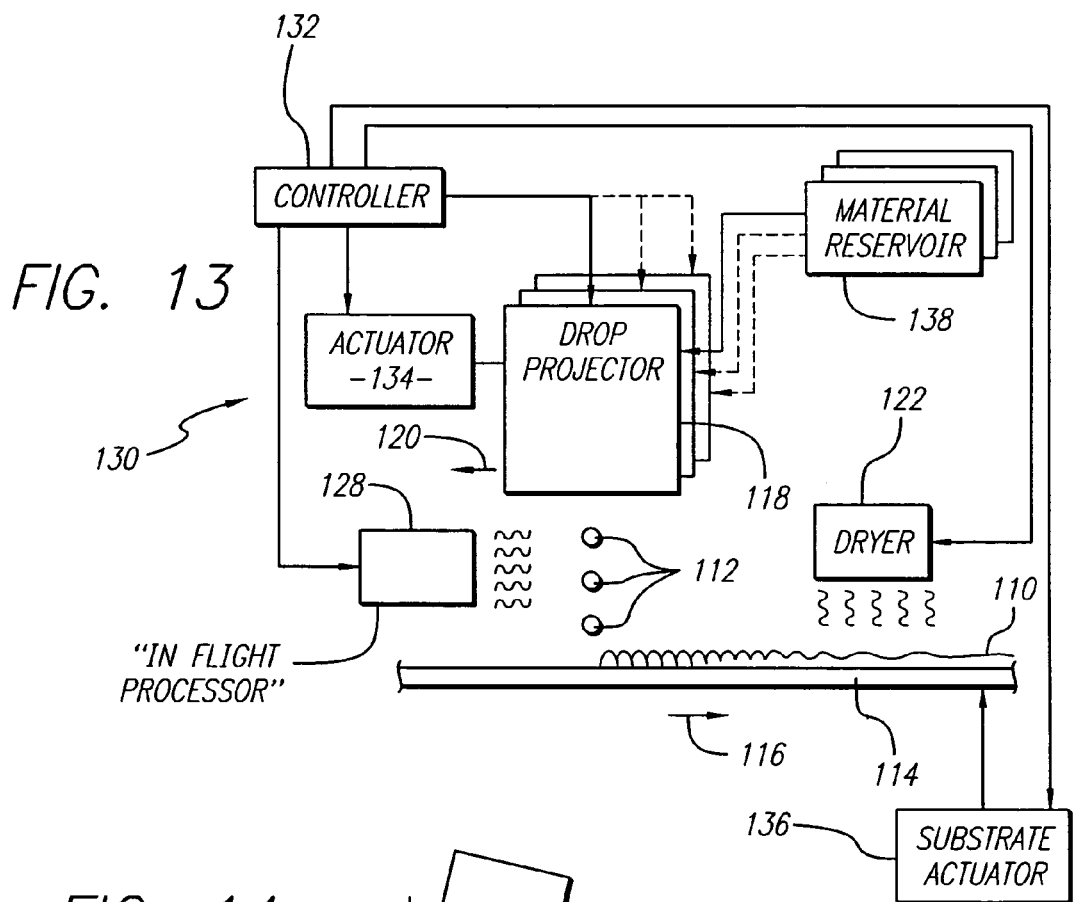
FIG. 13 is a schematic representation of a system for creating laminate constructions in accordance with one embodiment of the invention.

With reference to FIGS. 9 and 12, the morphology of deposited droplets 104, 106, 108 can be used to create differing layer topologies. Depending on factors such as the viscoelastic properties and surface energies of the materials comprising the droplets and the substrate 68 (which can be a previously deposited layer of the same material), the droplets are relatively compact like droplet 104, or more spread out like droplets 106 and 108. If the droplets touch each other after deposition, surface effects can give rise to more flow-out resulting in smoother topology with drying. This is illustrated in FIG. 13 by a layer 110 formed by controlled droplets 112. As the substrate 114 moves in a direction 116 relative to a drop projector 118, or the drop projector moves in a direction 120 relative to the substrate, the deposited material comes into proximity with a dryer 122 which increases the flow-out of the material. With reference to FIGS. 12 and 13, topology of a first area 124 comprising 3 built up layers of droplets more spread out on deposition and/or where more flow-out has occurred is different from that of a second area 126 comprising 3 built up layers exhibiting less deformation and/or flow-out. As will be appreciated the drawings are illustrative but not to scale.

Depending on the amount of drying, or curing, of previously deposited material upon which a next layer of material is placed more or less interaction different results can be obtained. The whole area may spread more as in the case of area 124 or less as in area 126. This is controllable by: selection of material; temperature; processing "in flight" as discussed above and represented at 128; time in a dryer 122; and time between successive depositions. It will be appreciated that since droplets are small and in projected droplet embodiments travel through an air medium or other gas environment significant increase in the rate of chemical and/or physical changes can be made. For example this can be due to enhanced mass transfer and/or reaction rates from surface area considerations. In the case of a PSA laminate construction, an internal mass transfer limiting state of greater than about 70% solids is more rapidly achieved. This gives rise to the advantage of requiring less subsequent drying time.

In general the amount of drying of the previously deposited material before the next deposition contacting it will influence the interaction between the deposited droplets and ultimately the properties of the construction 10. Factors such as the amount of mixing of the materials, as well as the weld strength between deposited drops, are directly affected by this parameter. In an extreme example, by depositing material in rows successively in alternate y-directions as the construction advances in the x direction a seemingly solid and continuous layer could be made to be capable of being "un-zipped" in sequential rows advancing in the negative x-direction, appearing much as a woven material is pulled apart by pulling a single thread from which it is formed.

With reference to FIG. 13, in a system 132 for forming layered structures using controlled droplet deposition techniques the relative position of the drop projector 118 and the substrate 114 is controlled by a controller 132. The controller can comprise a microprocessor-based control system including a processor, a timer, memory, and presently known position sensing by means of an encoder bar. Such control systems are well known, for example in ink jet printers. Control of relative position of the substrate to a drop projector (or alternatively a capillary needle dispenser) in the x-y plane can be by moving the drop projector by means of an actuator 134 such as stepper motor(s) along both x and y axes or only back and forth in the y while moving the substrate in the x direction by means of a substrate actuator 136. Coordinated timing of jetting by the controller enables a "digital" construction of a layered structure to be built up in the z direction as discussed above from a supply of material 138. As discussed above multiple controlled droplet deposition jets or capillary needles can be used to deposit multiple materials, mix materials (FIG. 11), etc. on a substrate 114. It will be understood that the controller 132 will control multiple controlled drop deposition means 118 such as side-by-side mounted thermal jets moving together, or separately actuated drop projectors moving independently from one another, but in a coordinated manner. Also, while for purposes of illustration a single stream of droplets 112 is shown, thermal jet drop on demand techniques can involve an array of jet orifices incorporated in an orifice plate, each operating separately from the others. Such well known techniques can be used to deposit materials forming a laminate structure in accordance with the invention.

With reference to FIG. 14, in continuous or drop-on-demand jetting onto a substrate 150 moving with respect to the drop projector 86 in a direction 152 parallel with the x axis at a high rate of speed, mitigation of the effect of lateral movement which otherwise can "smear" the deposited droplet by accelerating the first portion of the droplet to arrive at the substrate in a lateral direction thereby deforming the droplet. This can be done by moving air or another medium in laminar flow parallel with the moving substrate in the direction of movement to accelerate the droplets laterally while in flight, thereby mitigating the problem of smearing the drop. Also angling the trajectory of the droplets 90 decreases the difference in velocity in the direction of relative movement, also mitigating the problem.

On the other hand in some applications smearing of the droplet on impact may be desirable, to provide a thinner coat for example. Variation of this parameter is analogous to variation of deposited droplet morphology and flow-out to obtain a desired result. The effect can be accentuated by angling the trajectory in a direction opposite to that described above to increase the difference in lateral velocity.

Furthermore the trajectory could be angled to project the droplets in a lateral direction opposite to the direction of a laminar flow air stream. This will provide an arched trajectory and slow the droplet, thereby lengthening the time available for in-flight processing. In another embodiment a charge can be applied to the droplets, and an electric field can be used to control droplet trajectory in accordance with known conventional techniques for accomplishing this.

Figure 15:
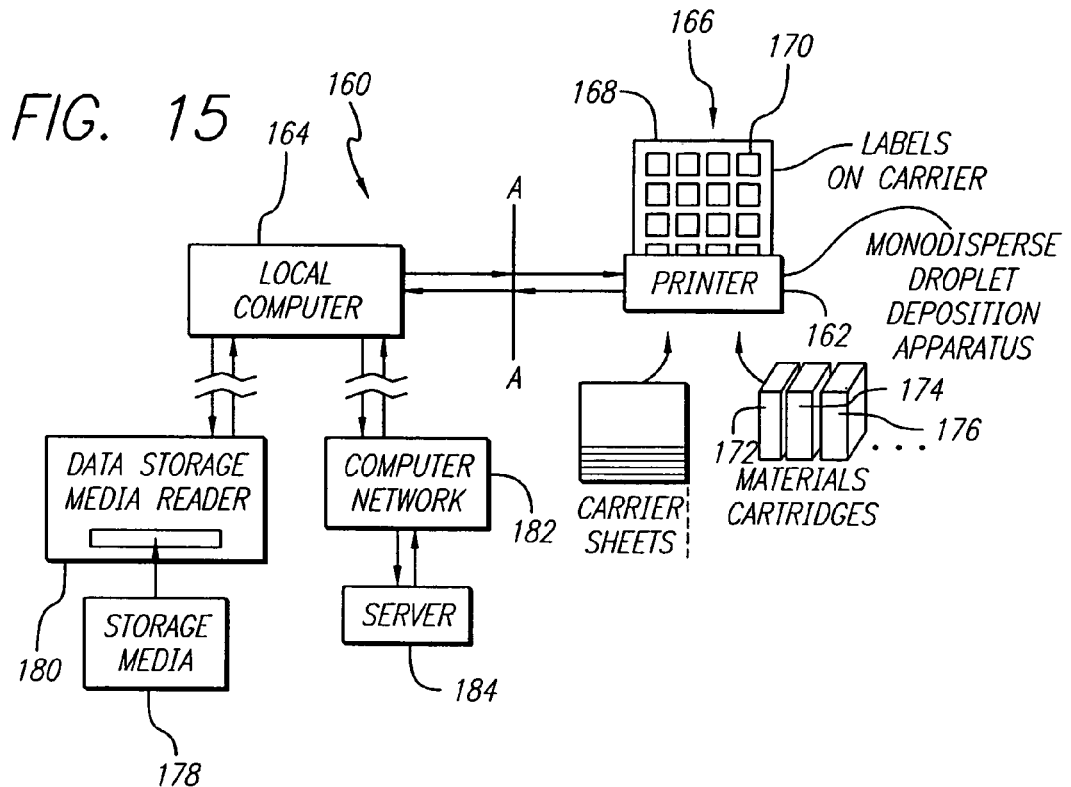
FIG. 15 is a schematic representation of a system for creating laminate constructions in accordance with principles of the invention, in one embodiment joining with FIG. 16 along line A—A.

With reference now to FIG. 15, the formation of layered constructions "digitally" allows novel methodologies for fabrication of laminate constructions. Again taking as an example but not limiting the invention to PSA laminate constructions such as labels (FIG. 10), a system for on-site small scale fabrication of customized labels is illustrated schematically. A controlled droplet deposition apparatus 162, which may comprise for example in a low cost implementation a modified conventional ink jet printer or plotter for example, is conventionally controlled by a personal computer 164 at a first, or local, fabrication site. With the object of producing a matrix free label construction 166 comprising a carrier sheet 168 for example with a plurality of matrix-free labels 170 thereon. The carrier sheets 168 can be supplied in desired quantities with or without a release coating layer pre-applied. Several different materials are supplied, for example contained in materials cartridges 172, 174, 176 for example, for deposition using controlled droplet deposition techniques described above. These too are obtained from a supplier, and comprise for example materials to form individual layers of the PSA construction 166.

Software needed to operate the controlled droplet deposition apparatus 162 can be maintained in a memory of the on-site computer 164, licensed from a supplier for example, and loaded via purchased storage media such as a magnetic disk or CD-ROM via an appropriate data storage media reader 180. Alternatively, the software could be delivered via a computer network 182 from a server 184 at a remote site. In another embodiment the software is maintained on the server 184 and accessed as needed by the customer. For example the supplier of the carrier sheets, materials cartridges to modify the printer to fabricate labels, and the software, can be a single company or licensees of that company.

A large inventory of graphics could be included with the software or maintained on the server 184, for example to incorporate a graphic element in the face stock. Alternatively fabrication can be in two segments, between which the labels of the construction 166 are printed in an unmodified ink-jet printer. Care in alignment of the carrier sheet is required as registration otherwise is poor.

Figure 16:
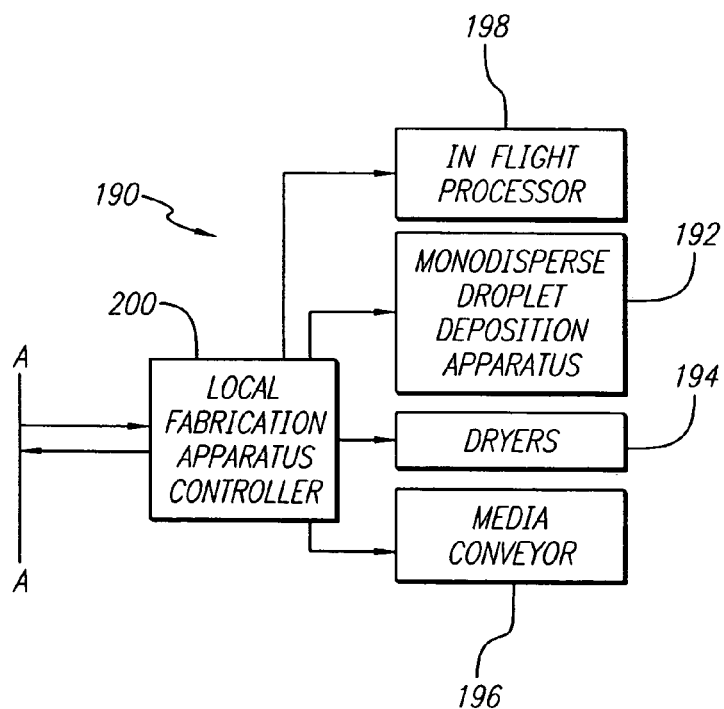
FIG. 16 is a schematic representation of a system for creating laminate constructions illustrating principles of the invention, wherein in accordance with one embodiment of the invention the diagram joins with that shown in FIG. 15 along line A—A.

With reference also to FIG. 16, instead of a relatively low volume application using a relatively small printer or plotter as the droplet deposition apparatus 162, a commercial scale implementation is shown where a fabrication line 190 is controlled by the local on-site computer 164. In addition to the droplet deposition apparatus 192 in this embodiment, additional line equipment such as dryers 194 and a conveyor 196 are included. An in-flight processor 198, such as a hot air zone or radiation beam discussed above can be included. When the complexity of the fabrication line makes it advantageous to provide a dedicated fabrication apparatus controller 200, it can be included to coordinate the actions of the various line elements 192, 194, 196, 198.

As will be appreciated with reference to FIGS. 15 and 16, the invention makes possible a distributed mode of manufacturing. This is particularly advantageous in businesses like PSA labels for example where distribution costs are high in comparison to other costs when the volume of products sold to a particular customer is small. It allows regional manufacturing sites located close to customers, or even at customer sites, to be controlled or serviced from a centralized location. Distribution costs can be reduced, faster delivery is possible, and inventories formerly maintained at a central location are no longer necessary.

Figure 17:
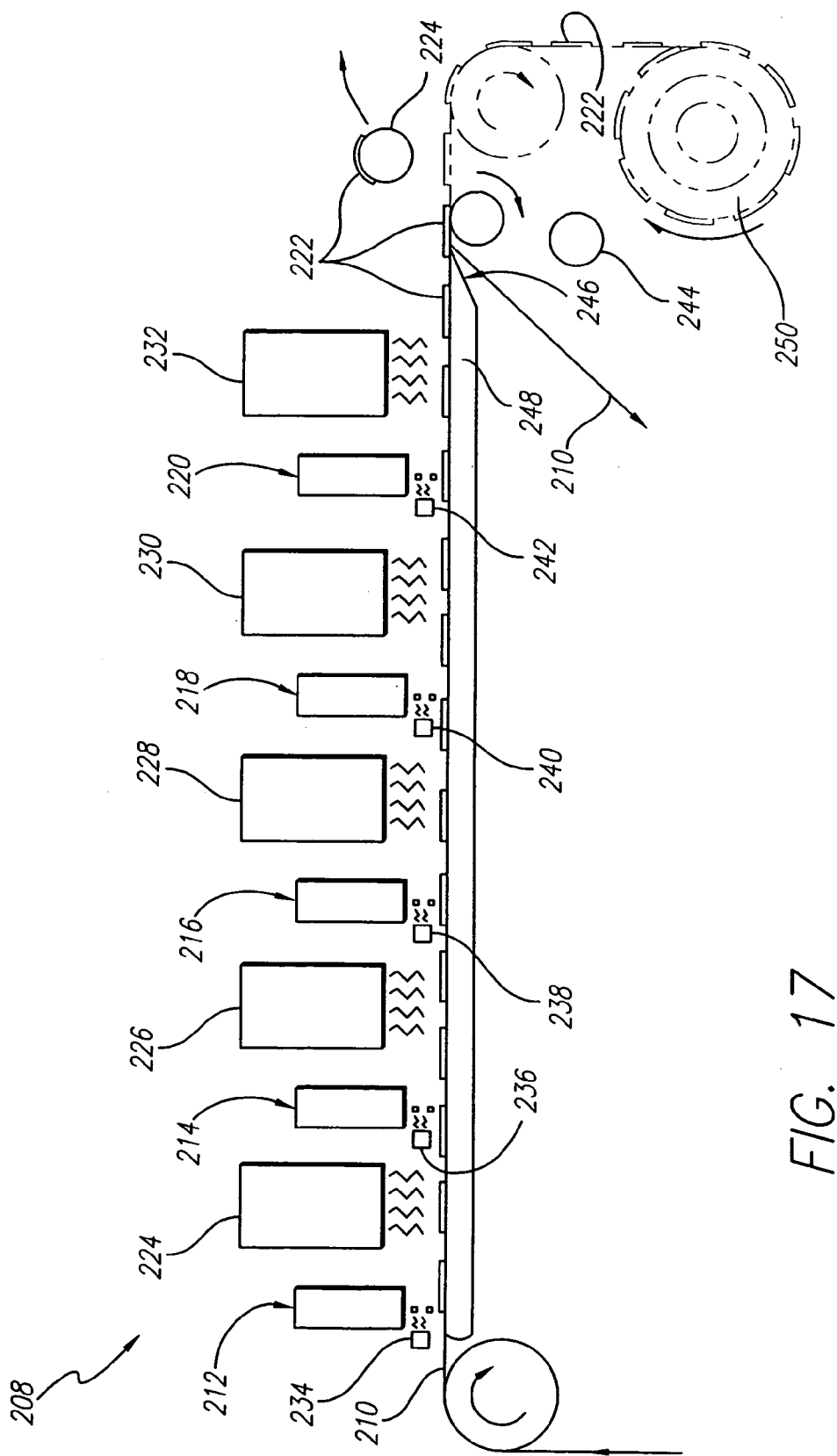
FIG. 17 is a schematic representation of a system for creating laminate constructions in accordance with principles of the invention in a manufacturing context.

An example of a fabrication line 208 in accordance with principles of the invention is shown in FIG. 17. A carrier 210, which may be for example a continuous loop casting sheet, or a conventional kraft paper backing or the like, is moved past a number of controlled droplet formation and deposition stations 212, 214, 216, 218, 220. A greater or lesser number of stations can be employed, or activated, or deactivated, as needed to construct a particular desired structure.

Taking as an example a PSA label structure 222, a first station 212 forms a release layer by droplet deposition on the carrier 210. A second station forms a PSA layer of the construction, and a third 216 a facestock which has a surface topology giving an illusion of brush strokes. At a fourth station 218 an image is deposited on the facestock, giving a painted canvass appearance, and at a fifth station a clear protective layer is deposited over the image. As will be appreciated each of these stations represented can itself comprise multiple stations, for example to create a surface topology by successive depositions. In between the stations are processors 224, 226, 228, 230, 232 such as dryers, radiation sources for curing by crosslinking, or the like, to process the deposited material as it travels between stations for example to control flow-out, solids content, and/or other parameters. Furthermore "in flight" processors 234, 236, 238, 240, 242, such as hot air zones, radiation sources, etc. described above can be provided adjacent each station.

As will be appreciated appropriate measures are taken to insure processes occurring at one location do not interfere with those at another. Also one or more stations can be more conventional in its methodology, for example die cutting the edges of a completed construction to provide a sharper edge of the construction and mitigate any deficiency in registration of layer deposition, or laminating a protective carrier to the top of the completed construction, to name some examples.

The line 208 can be set up to dispense the PSA label constructions 222 directly onto products 244 by pulling the carrier 210 around an edge 246 of a peel plate 248. Alternatively the finished label constructions can be wound onto a roll 250 for storage until they are dispensed in another operation or until further processing takes place.

As can be appreciated a great deal of variation in the set up of the line 208. Such things as spacing of the stations (212 . . . to 220), processors (224 . . . to 232) and other elements is a function of the application(s) to which the line is to be suited. As will be appreciated in higher line speed operations the drop projector can comprise arrays of individual drop projectors, which themselves may comprise arrays of jet orifices for example. Higher line speeds can involve drop on demand or continuous drop projectors able to turn off and on in a precisely controlled way disposed so as to deposit a pattern as the substrate moves past. Multiple drop projectors depositing different materials can be located at each station, and the projectors can be fixed or configured to move in one or both of the x and y directions as required in a particular application.

Likewise in contact techniques multiple capillary needles arranged in arrays can be employed. These can be so as to move all at once up and down for example, and multiple arrays can deposit closely spaced droplets by being offset from one another so that at successive stations a pattern is built up.

Figure 18:
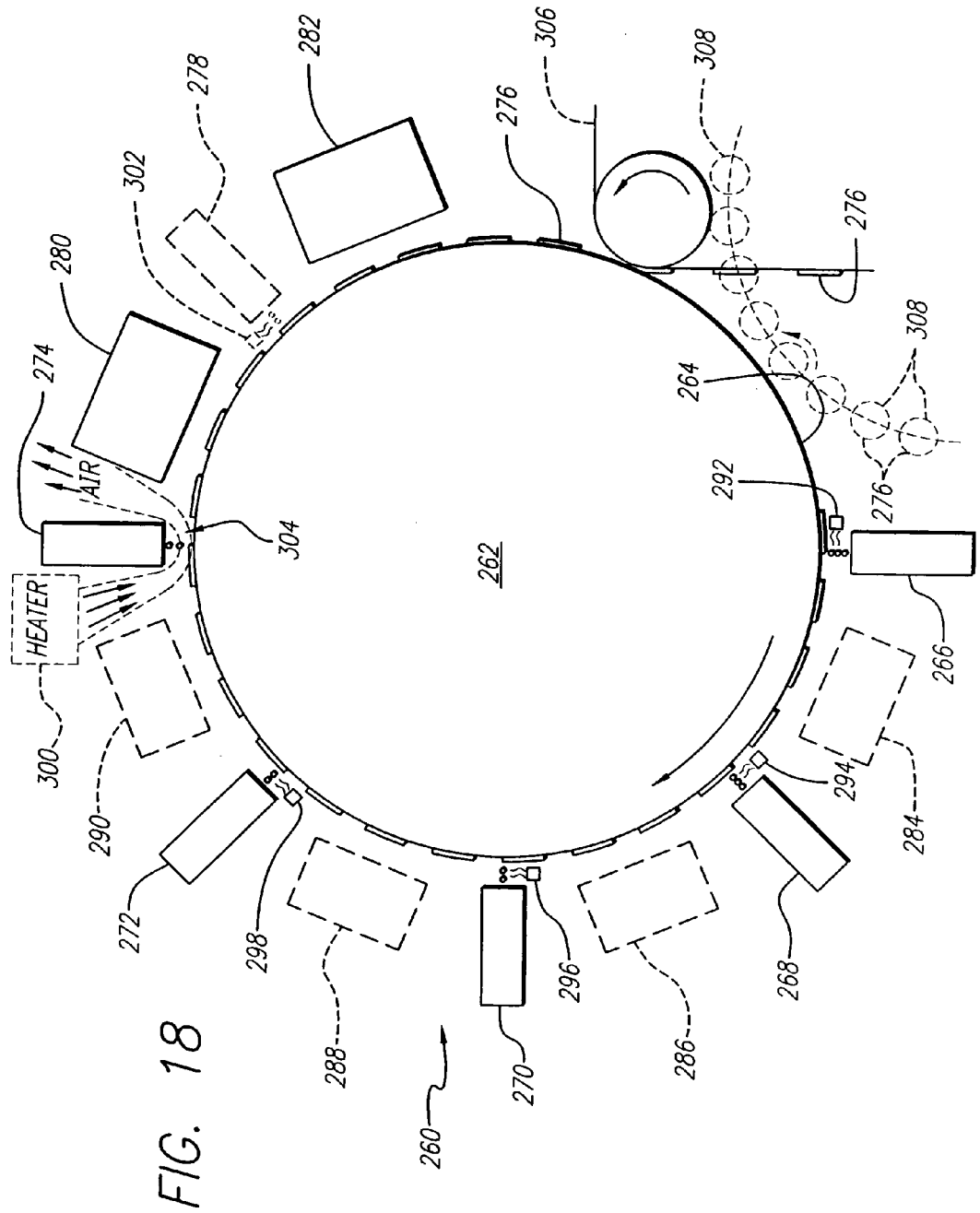
FIG. 18 is a schematic representation of a system for creating laminate constructions in accordance with principles of the invention in a manufacturing context.

With reference to FIG. 18 in a different exemplary embodiment a fabrication line 260 is arranged around a drum 262 comprising a casting sheet surface 264 formed of polished stainless steel or Teflon for example. Multiple droplet deposition stations 266, 268, 270, 272, 274 are disposed about the drum, each depositing successive layers of the same or differing materials as required to form a desired layered construction, for example labels 276. In this embodiment the label is constructed "upside down" with the topmost layer of the label being deposited at the first station. The PSA layer is formed last at a PSA deposition station 274. A further station 278 can be provided to treat the exposed PSA layer surface in some way, for example laying down a pattern of activator or detackifier, or by deposition of a material that reacts with, or acts in cooperation with, the PSA layer to change its properties.

Dryers 280, 282 can be provided to process the PSA layer after deposition of one or more layers of material within the PSA layer to give the desired properties as discussed above. Furthermore other post-deposition processors 284, 286, 288, 290, which can be apparatus to modify the deposited material in one or more of the ways discussed above for example, are placed in the line 260 where needed for a particular layered construction label product 276.

Also in-flight droplet processors 292, 294, 296, 298, 300 and 302 can be provided functioning as described above to modify the droplets in flight between the drop projectors and the substrate onto which they are deposited. For example a laminar flow hot air zone 304 is formed adjacent the PSA controlled droplet deposition station 274 by the in-flight processor 300.

In one embodiment the label construction 276 is delaminated from the casting surface 264 by contacting it with a carrier 306. By selectively tacking and/or detackifing the adhesive layer at the leading and/or trailing edge the PSA layer, for example by including a further station 278 to treat the surface, the label can be delaminated from the casting surface 265 by an aggressive adhesive locally deposited there contacting the carrier sheet 306. The carrier can be one of a number of commercially available, and can be coated with a silicone release. The rest of the adhesive is less tacky, but follows the leading edge onto the carrier. Subsequent dispensing is done in the opposite direction, and the aggressive adhesive is at the trailing edge then. Peel force at the beginning of delamination of the label's leading edge can be kept low in this way, even though at the other end of the label the adhesive has a high peel force so that the construction will bond with the carrier, which can already have a release coating applied, to delaminate it from the casting surface. Alternatively, the PSA label construction 276 can be directly applied to a product 308 by contact, as the PSA layer is topmost and exposed.

It will be apparent from the foregoing that while a particular form of the invention has been illustrated and described, various modifications can be made without departing from the spirit and scope of the invention. Accordingly, it is not intended that the scope of the invention be limited, except as by the limitations of the appended claims.

We claim:

1. A controlled droplet-formed built-up layered structure, comprising:
   a substrate,
   at least two controlled droplet-formed layers, one layer at least partially atop another layer to form at least one built-up layer, each layer further comprising an array of controllably-placed material volumes having a thickness, each material volume having a selected magnitude and a selected position relative to adjacent material volumes, said array being formed by deposition of droplets of selected volume at selected locations with respect to one another;

wherein the structure is an adhesive label having a facestock layer and an adhesive layer, the facestock and adhesive layers both being droplet-formed; and wherein the structure comprises at least the following droplet-formed layers: a primer layer, a facestock layer, an adhesive layer, and a printcoat layer.

2. The controlled droplet-formed built-up layered structure of claim 1, wherein the structure further comprises an image.

3. The controlled droplet-formed built-up layered structure of claim 2, wherein the structure further comprises a protective coat deposited over the image.

4. A controlled droplet-formed layered structure, comprising:

a substrate;

at least two controlled droplet-formed layers, each further comprising an array of controllably-placed material volumes having a thickness extent, each material volume having a selected magnitude and a selected position relative to adjacent material volumes, said array being formed by deposition of droplets of selected volume at selected locations with respect to one another;

wherein the controlled droplet-formed layered structure is a pressure sensitive adhesive label comprising the following droplet-formed layers atop a substrate: an adhesive layer, a face stock layer, a print coat layer.

5. A controlled droplet-formed layered structure as described in claim 4, where the label further comprises the following droplet-formed layers: a primer layer and a print coat layer.

6. A controlled droplet-formed layered structure as described in claim 4, in which said label is one label on a matrix-free label sheet of droplet-formed labels.

* * * * *